United States Patent [19]
Davis et al.

[11] Patent Number: 5,256,228
[45] Date of Patent: Oct. 26, 1993

[54] HEAT SEAMABLE ROOF SHEETING WITH HIGHLY CRYSTALLINE THERMOPLASTICITY PROMOTERS AND METHODS FOR COVERING ROOFS

[75] Inventors: James A. Davis, Uniontown; Joseph K. Valaitis, Brecksville, both of Ohio

[73] Assignee: Bridgestone Corporation, Tokyo, Japan

[21] Appl. No.: 802,800

[22] Filed: Dec. 6, 1991

[51] Int. Cl.$^5$ .............. E04F 13/00; C08L 53/00; C08L 23/16; C08K 03/22

[52] U.S. Cl. ..................... 156/157; 156/71; 52/746; 525/211; 525/232; 525/240; 524/413; 524/426; 524/427; 524/525; 428/343; 428/489

[58] Field of Search ............ 525/240, 232, 211; 524/525, 426, 427, 413; 428/343, 489; 156/71, 157; 52/746

[56] References Cited

U.S. PATENT DOCUMENTS

| | | | |
|---|---|---|---|
| 3,280,082 | 10/1966 | Natta et al. | 260/80.7 |
| 3,650,874 | 3/1972 | Job et al. | 161/217 |
| 3,660,530 | 5/1972 | Hoblit et al. | 525/95 |
| 3,801,531 | 4/1974 | Berejka et al. | 260/33.4 |
| 3,867,247 | 2/1975 | O'Farrell et al. | 161/88 |
| 3,887,530 | 6/1975 | O'Farrell et al. | 260/79.3 |
| 3,919,358 | 11/1975 | Batiuk et al. | 260/897 |
| 3,941,859 | 3/1976 | Batiuk et al. | 260/897 |
| 4,036,912 | 7/1977 | Stricharczuk | 260/897 |
| 4,130,535 | 12/1978 | Coran et al. | 260/33.6 |
| 4,210,579 | 7/1980 | Grigo et al. | 525/88 |
| 4,212,787 | 7/1980 | Matsuda et al. | 260/33.6 |
| 4,220,579 | 9/1980 | Rinehart | 260/33.6 |
| 4,229,504 | 10/1980 | Brachman | 428/461 |
| 4,247,661 | 1/1981 | Herman et al. | 525/88 |
| 4,263,186 | 4/1981 | Bluemel | 524/59 |
| 4,355,139 | 10/1982 | Coran et al. | 525/133 |
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,537,825 | 8/1985 | Yardley | 428/327 |
| 4,599,258 | 7/1986 | Hageman | 156/71 X |
| 4,601,935 | 7/1986 | Metcalf et al. | 428/57 |
| 4,687,810 | 8/1987 | Coran | 525/74 |
| 4,732,925 | 3/1988 | Davis | 524/426 |
| 4,742,119 | 5/1988 | Close | 525/211 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |

(List continued on next page.)

OTHER PUBLICATIONS

"Rubber-Thermoplastic Compositions. Part V Selecting Polymers for Thermoplastic Vulcanizates", *Rubber Chem. Technol.*, p. 116, vol. 55, by A. Y. Coran et al.

*Primary Examiner*—George F. Lesmes
*Assistant Examiner*—D. R. Zirker
*Attorney, Agent, or Firm*—Frank J. Troy, Sr.

[57] ABSTRACT

A heat seamable sheet material for roofing prepared from an uncured polymeric composition of matter which comprises 100 parts by weight of a polymer blend comprising from about 50 to 90 parts by weight of polyolefins having up to about 2 percent by weight crystallinity, which polyolefins are prepared from monomers having at least 2 carbon atoms, and mixtures thereof and from about 10 to 50 parts by weight of a highly crystalline thermoplasticity promoter selected from the group consisting of polymeric olefins prepared from monomers consisting of at least two carbon atoms; from about 50 to 250 parts by weight of a filler selected from the group consisting of reinforcing and non-reinforcing materials and mixtures thereof per 100 parts of the polymer blend; and from about 20 to 150 parts by weight of a processing material and mixtures thereof, per 100 parts of the polymer blend. A method for covering a roof comprises the steps of applying layers of sheet material as described above to the roof being covered; overlapping adjacent edges of the layers; heating the overlapped areas to slightly above the softening point of the sheet material and seaming the overlapped areas using heat and sufficient pressure to provide an acceptable seam, the composition of matter having sufficient self-adhesion without the use of an adhesive.

3 Claims, No Drawings

U.S. PATENT DOCUMENTS

| | | | |
|---|---|---|---|
| 4,803,020 | 2/1989 | Valaitis et al. | 264/22 |
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,362 | 8/1989 | Muse, Jr. et al. | 525/194 |
| 4,894,408 | 1/1990 | Hazelton et al. | 524/425 |
| 4,897,137 | 1/1990 | Miller et al. | 156/157 |
| 4,912,148 | 3/1990 | Kim et al. | 524/487 |
| 4,918,127 | 4/1990 | Adur et al. | 524/415 |
| 4,944,818 | 7/1990 | Dybsky et al. | 156/71 |
| 4,985,502 | 1/1991 | Izumi et al. | 525/194 |
| 4,990,568 | 2/1991 | Benefield et al. | 525/232 |
| 4,994,328 | 2/1991 | Cogliano | 156/71 X |
| 5,070,111 | 12/1991 | Dumbauld | 521/82 |
| 5,073,597 | 12/1991 | Purydak et al. | 525/211 X |
| 5,084,119 | 1/1992 | Barksdale | 156/157 |
| 5,086,121 | 2/1992 | Hazelton et al. | 525/197 |

HEAT SEAMABLE ROOF SHEETING WITH HIGHLY CRYSTALLINE THERMOPLASTICITY PROMOTERS AND METHODS FOR COVERING ROOFS

TECHNICAL FIELD

The present invention relates generally to sheeting material used for roofing. More particularly the sheeting material is comprised of ethylene-propylene-diene terpolymers, referred to herein as EPDM and highly crystalline thermoplasticity promoters such as high density polyethylene (HDPE), low density polyethylene (LDPE) and other similar olefin type polymers as well as copolymers of ethylene/butene and ethylene/octene and the like and mixtures thereof. A method is also provided for covering roofs which includes the step of employing the sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation curing and sulfur curing, a disadvantage of utilizing these elastomers is the lack of adhesion of EPDM, especially cured EPDM, to itself. This is a serious problem because in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fishmouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both the short term and long term stresses such as those discussed hereinabove. Moreover, the adhesive must be resistant to oxidation, hydrolysis and chemical attack from ponded water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two to about seven days at room temperature (i.e. 22° C.) to attain maximum adhesive strength. At higher ambient temperature, this time period may be somewhat less but at minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two to seven days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. No. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous. Also, a need for elastomeric roofing material with improved seam strength at elevated temperatures continues to exist.

SUMMARY OF THE INVENTION

It is thus an object of the present invention to provide heat seamable EPDM roof sheeting materials that show high seam strength at elevated temperatures.

It is still another object of the present invention to provide a method for covering roofs which employs a heat seamable EPDM as roof sheeting materials.

It is another object of the present invention to provide compositions which have sufficient crystallinity to show thermoplastic behavior during the formation of a seam using both heat and pressure.

It is yet another object of the present invention to provide compositions which demonstrate thermoplastic flow characteristics at elevated temperatures and elastomeric characteristics at ambient temperatures.

In general the present invention relates to a heat seamable sheet material for roofing prepared from a polymeric composition of matter comprising 100 parts by weight of a polymer blend comprising from about 50 to 90 parts by weight of a polymer selected from the group consisting of polyolefins having up to about 2 percent by weight crystallinity, which polyolefins are prepared from monomers having at least 2 carbon atoms, and mixtures thereof and from about 10 to 50 parts by weight of a highly crystalline thermoplasticity promoter selected from the group consisting of polyolefin polymers prepared from monomers containing at least two carbon atoms; from about 50 to 250 parts by weight of a filler selected from the group consisting of reinforcing and non-reinforcing materials and mixtures thereof per 100 parts of the polymer blend; and from about 20 to 150 parts by weight of a processing material and mixtures thereof per 100 parts of the polymer blend.

A method for covering a roof is also provided and comprises the steps of applying layers of the sheet material described above roof being covered; overlapping adjacent edges of the layers; heating the overlapped areas to slightly above the softening point of the sheet material; and seaming the overlapping areas using heat and under sufficient pressure to form an acceptable seam.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise EPDM terpolymers. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference. The preferred polymers having from about 35 to about 70 weight percent ethylene and up to about 12 weight percent of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

Particularly useful and preferred EPDM materials include Vistalon ® MD-744 (Exxon Chemical Co.); and Royalene ® 3180 (Uniroyal Chemical Co.). Vistalon ® MD-744 has a Mooney Viscosity (ML/4 at 125° C.) of about 52; an E/P ratio of about 61/39 weight percent and about 2.7 weight percent of unsaturation (ethylidene norbornene). Royalene ® 3180 has a Mooney Viscosity (ML/4 at 125° C.) of about 46; an E/P ratio of about 65/35 weight percent and about 2.2 weight percent of unsaturation (ethylidene norbornene). Other useful EPDM terpolymers include Royalene ® 3093 (Uniroyal Chemical Company) having an E/P ratio of about 65/35 weight percent and Vistalon ® MD-727 (Exxon Chemical Company) having an E/P ratio of about 56/44 weight percent and about 1.7 weight percent of unsaturation (ethylidene norbornene).

Another typical EPDM is Nordel ® 1070 (duPont) an ethylene/propylene/1,4-hexadiene terpolymer having an E/P ratio of about 58/42 and about 1.9 weight percent of unsaturation (1,4-hexadiene). This particular EPDM terpolymer has less than one weight percent crystallinity, from the ethylene component; an $\overline{Mn}$ as measured by GPC of at least about 87,000 and an $\overline{Mw}$, as measured by GPC of at least about 188,000.

To be useful as a roofing material in the present invention it is necessary that the EPDM have an $\overline{Mn}$ as measured by GPC of at least about 30,000 and an $\overline{Mw}$, as measured by GPC of at least about 100,000.

Most importantly, the roof sheeting materials of the present invention include within the polymeric composition, a thermoplasticity promoter, such as high density polyethylene (HDPE), low density polyethylene (LDPE) or other polyolefins prepared from monomers containing at least two carbon atoms. Typical examples of commercially available thermoplasticity promoters that can be blended with EPDM have been set forth in Table I along with melting temperatures and percent of crystallinity. The melt temperatures and amount of crystallinity were determined using differential scanning calorimeter (DSC) technique.

TABLE I

| Crystallinity Enhancing Polymers | | |
|---|---|---|
| ETHYLENE HOMOPOLYMERS | Tm. °C. | % crystallinity |
| POLYWAX 2000[a] | 128 | 89.9 |
| POLYWAX 3000[b] | 121 | 93.2 |
| LDPE 722[c] | 112 | 39.1 |
| LDPE 132[d] | 109 | 27.7 |
| LDPE 640[e] | 113 | 39.9 |
| LDPE 768[f] | 119 | 45.8 |
| LDPE CG-2523[g] | 111 | 53.6 |

TABLE I-continued

Crystallinity Enhancing Polymers

| ETHYLENE HOMOPOLYMERS | Tm. °C. | % crystallinity |
|---|---|---|
| HDPE 12065[h] | 134 | 66.8 |
| HDPE 62013[i] | 131 | 61.2 |
| PETROLITE E-2020[j] | 116 | 85.9 |
| POLYPROPYLENE HOMOPOLYMERS | | |
| EASTOBOND D-7682-109S[k] | 153 | 4.7 |
| A-FAX 500[l] | 155 | 5.8 |
| ETHYLENE/PROPYLENE COPOLYMERS | | |
| RLX-020[m] | 152 | 35.8 |
| ETHYLENE/OCTENE COPOLYMERS | | |
| ATTANE 4003[n] | 123 | 36.9 |
| ATTANE 4001[o] | 124 | 35.0 |
| DOWLEX 2047AP | 124 | 39.8 |
| DOWLEX 2045[q] | 124 | 42.2 |
| DOWLEX 2038[r] | 127 | 53.6 |
| DOWLEX 2027[s] | 113 | 41.5 |
| ETHYLENE/BUTENE COPOLYMER | | |
| GERS-1085[t] | 71 | 2.3 |

[a]High melting polyethylene having a molecular weight of about 2000 (Petrolite)
[b]High melting polyethylene having a molecular weight of about 3000 (Petrolite)
[c]Low density polyethylene resin, density 0.915 (Dow Chemical)
[d]Low density polyethylene resin, density 0.919 (Dow Chemical)
[e]Low density polyethylene resin, density 0.922 (Dow Chemical)
[f]Low density polyethylene resin, density 0.930 (Dow Chemical)
[g]Low density polyethylene resin, density 0.923 (Dow Chemical)
[h]High density polyethylene resin, density 0.94 (Dow Chemical)
[i]High density polyethylene resin, density 0.94 (Dow Chemical)
[j]Petroleum-derived oxidized hydrocarbon having an acid number of 22 (Petrolite)
[k]Amorphous polypropylene (Eastman Chemical)
[l]Amorphous polypropylene (Himont, USA, Inc.)
[m]Ethylene/propylene copolymer (2% Ethylene) molecular weight about 400,000 (Phillip's Petroleum)
[n]Ethylene-octene copolymer, density 0.905 (Dow Chemical)
[o]Ethylene-octene copolymer, density 0.912 (Dow Chemical)
[p]Ethylene-octene copolymer, density 0.917 (Dow Chemical)
[q]Ethylene-octene copolymer, density 0.920 (Dow Chemical)
[r]Ethylene-octene copolymer, density 0.935 (Dow Chemical)
[s]Ethylene-octene copolymer, density 0.941 (Dow Chemical)
[t]Ethylene-butene copolymer (about 82% ethylene), density 0.884 (Union Carbide Corporation)

The highly crystalline thermoplasticity promoters listed in Table I are necessary, when the polymer blend comprises increasing amounts of EPDM terpolymer having less than 2 weight percent crystallinity. However, even if the EPDM terpolymer selected is exclusively one having crystallinity greater than 2 percent by weight, the weight, the presence of a crystalline thermoplasticity promoter of the present invention provides increased adhesion, especially seam shear strength.

Particularly useful and preferred thermoplasticity promoters include HDPE 12065, HDPE 62013, LDPE CG-2523 and LDPE 768, all commercially available from Dow Chemical. HDPE 12065 has a specific gravity of 0.94; a peak softening temperature of 134° C. and a crystallinity of 66.8 weight percent. HDPE 62013 has a specific gravity of 0.94; a peak softening temperature of 131° C. and a crystallinity of 61.2 weight percent; LDPE CG-2523 has a specific gravity of 0.923, a peak softening temperature of 111° C. and a crystallinity of 53.6 weight percent. LDPE 768 has a specific gravity of 0.93, a peak softening temperature of 119° C. and a crystallinity of 45.8 weight percent.

The composition or compound employed to form the roof sheeting material comprises about 50 to 90 parts by weight of EPDM, or other similar olefinic type terpolymers, including mixtures of two or more types, to which is added from about 10 to 50 parts by weight of a highly crystalline thermoplasticity promoter selected from the group consisting of polymeric olefins prepared from monomers containing at least two carbon atoms, fillers and processing materials as well as optionally other components including curatives, all of which are discussed hereinbelow.

With respect first to the filler, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Generally, preferred fillers include carbon black, ground coal and cryogenically ground rubber.

Carbon black is used in an amount of about 20 parts to about 300 parts per 100 parts of polymer (phr), preferably in an amount of about 60 to about 150 phr. The preferred range of carbon black herein (60 to 150 phr) is about equal to the amount of carbon black normally used in preparing sulfur cured EPDM roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of about 1.129±0.015 and a particle size ranging from about 30 to about 300 microns with an average particle size ranging from about 50 to about 80 microns. Amounts range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional roof sheeting.

With respect to the processing materials, it is included to improve the processing behavior of the composition (i.e. reduce mixing time and increase calendering rate). The processing materials is included in an amount ranging from about 20 parts to about 150 parts by weight of processing materials per 100 parts EPDM ingredient, preferably in an amount ranging from about 60 parts of about 100 parts by weight. A preferred processing materials is a paraffinic oil, e.g. Sunpar 2280 which is available from the Sun Oil Company. Other petroleum derived oils including naphthenic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other conventional additives, such as zinc oxide, stearic acid, antioxidants, antiozonants, flame retardants, and the like.

The compounding ingredients can be admixed, utilizing an internal mixer (such as a Banbury mixer), an extruder, and/or a two-roll mill, or other mixers suitable for forming a viscous relatively uniform admixtures. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is sheeted to thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufactures Association for non-reinforced black EPDM rubber sheets for use in roofing applications. In many cases, the admixture is sheeted to 40–45 gauge, since this is the thickness for a large percentage of "single-ply" roofing membranes used commercially. The sheeting can be cut to desired length and width dimensions at this time.

The method of the present invention is practiced by utilizing an EPDM sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

Assuming an overlap of several inches, the next step is to apply heat and some pressure to the edge area to form the seam. Temperature is conveniently applied from about 80° to 550° C. Generally, the seam area, comprising overlapping edges of adjacent sheets, should be heated to slightly above the softening temperature of the sheet material. Numerous techniques which utilize heat and pressure can be used to produce an effective seam as are known to those skilled in the art. Pressure can vary widely from a minimum of about 3 psi up to about 60 psi, typically so long as it is adequate to provide an acceptable seam.

In order to demonstrate practice of the present invention, several EPDM compounds according to the present invention were prepared and subjected to both peel and shear adhesion tests, as will now be set forth in detail. The EPDM polymer selected was Vistalon ® MD-744 characterization of which is presented in Table II hereinbelow.

TABLE II

| Polymer Characterization Study | |
|---|---|
| | Vistalon ® MD-744 |
| ML/4 at 125° C. | 52 |

TABLE II-continued

| Polymer Characterization Study | |
|---|---|
| | Vistalon ® MD-744 |
| Ethylene Content, weight % | 61 |
| Crystallinity, weight % | <1 |
| Tg, °C. (by DSC) | −56.4 |
| Tm, °C. (by DSC) | 41.6 |
| Unsaturation, weight % | 2.7 |
| Type of Unsaturation | ENB[a] |
| $\overline{Mn}$ | 73,200 |
| $\overline{Mw}$ | 360,400 |
| $\overline{Mn}/\overline{Mw}$ ratio | 4.92 |

[a]5-ethylidene-2-norbornene

The following examples represent heat seamable membrane compositions based upon the Vistalon ® MD-744, an EPDJM terpolymer and commercially available from Exxon Chemical Co. and are submitted for the purpose of further illustrating the nature of the present invention and are not to be considered as a limitation on the scope thereof.

TABLE III

Heat Seamable Membranes:
Blends of Amorphous EPDM and HDPE

| Example No. | 1 | 2 | 3 | 4 | 5 | 6 |
|---|---|---|---|---|---|---|
| Vistalon ® MD-744 | 100 | 90 | 80 | 70 | 60 | 50 |
| HDPE-12065 | — | 10 | 20 | 30 | 40 | 50 |
| HiStr GPF Black | 110 | 110 | 110 | 110 | 110 | 110 |
| Paraffinic Process Oil | 70 | 70 | 70 | 70 | 70 | 70 |
| TOTAL | 280 | 280 | 280 | 280 | 280 | 280 |

In the examples illustrated in Table III, Example No. 1 provide an EPDM membrane based on Vistalon ® MD-744 (without HDPE) as the control. Example No. 1 features 100% Vistalon ® MD-744, an amorphous (non-crystalline) EPDM terpolymer having a Mooney Viscosity (ML/4 at 125° C.) of about 52; an ethylene/propylene (E/P) ratio of 61/39 weight percent and 2.7 weight percent of unsaturation. Examples No. 2–6 were based on blends of Vistalon ® MD-744 and HDPE 12065, a highly crystalline homopolymer of polyethylene. Example No. 1 was prepared utilizing standard rubber mixing techniques and equipment by mixing together the following ingredients: 100 parts EPDM terpolymer, 110 phr HiStr GPF black and 70 phr paraffinic process oil. The remaining examples No. 2–6 comprised 50 to 90 parts of the EPDM terpolymer, 10 to 50 phr HDPE 12065 and the same levels of carbon black and process oil used in the preparation of Example No. 1. Formulations for each appear in Table III, hereinabove with all parts per hundred parts of rubber hydrocarbon (phr) by weight, unless otherwise specified.

Physical testing data such as stress-strain properties, die C tear resistance and hardness data are provided in Table IV hereinbelow.

TABLE IV

Heat Seamable Membranes: Blends of Amorphous EPDM and HDPE - Unaged Physical Properties

| Example No. | 1* | 2 | 3 | 4 | 5 | 6 |
|---|---|---|---|---|---|---|
| Stress-Strain Properties @ 23° C. | | | | | | |
| 100% Modulus, psi | 65 | 145 | 250 | 460 | 600 | — |
| 300% Modulus, psi | 75 | 175 | — | — | — | — |
| Tensile at break, psi | 110 | 195 | 335 | 495 | 615 | 720 |
| Elongation at | 730 | 350 | 240 | 130 | 110 | 90 |

TABLE IV-continued

Heat Seamable Membranes: Blends of Amorphous EPDM and HDPE - Unaged Physical Properties

| Example No. | 1* | 2 | 3 | 4 | 5 | 6 |
|---|---|---|---|---|---|---|
| break, % | | | | | | |
| Die C Tear Properties | | | | | | |
| lbs/inch at 23° C. | 33 | 71 | 135 | 176 | 204 | 228 |
| lbs/inch at 70° C. | 9 | 24 | 47 | 66 | 87 | 139 |
| lbs/inch at 93° C. | 7 | 18 | 42 | 57 | 80 | 121 |
| Shore "A" Hardness | | | | | | |
| unaged - Tested at 23° C. | 40 | 58 | 73 | 80 | 86 | 90 |
| ASTM Brittleness Test | | | | | | |
| Brittle Point, °C. | −48.3 | −48.8 | −48 | −47.2 | −46.1 | −45.3 |

*100% Amorphous EPDM control

For testing purposes, dumbbell shaped specimens were cut from individual milled 45 mil flat sheets according to ASTM D-412 (Method A-dumbbell and straight). Modulus, tensile strength and elongation at break measurements were obtained using a table model Instron ® Tester, Model 1130, and the test results were calculated in accordance with ASTM D-412. All dumbbell specimens were allowed to set for about 24 hours, following which testing was carried out at 23° C. Shore "A" hardness testing was conducted at 23° C. in accordance with ASTM Method D-2240.

Tear properties of milled 45 mil flat rubber sheets cut with a die C (90° angle die) were determined in accordance with ASTM Method D-624. Die C tear specimens were not nicked prior to testing. Tear resistance, in lbs/inch was obtained using a table model Instron ® Tester, Model 1130 and the test results were calculated in accordance with ASTM Method D-624. Testing was again carried out at 23° C.

The uncured black and oil filled roofing membrane formulations featuring HDPE 12065, a highly crystalline homopolymer of polyethylene, in Examples No. 2-6, were characterized, for the most part, as higher modulus compositions having unaged die C tear and hardness properties much higher than the 100% amorphous EPDM control, Example No. 1. Increases in modulus, tensile strength, die C tear and hardness properties resulted at the higher HDPE 12065 loadings.

Seam peel and shear adhesion tests were also conducted, utilizing the adhesion test pads discussed hereinbelow, and are reported in Tables V and VI, respectively.

DETAILED PEED AND SHEAR ADHESION TEST PROCEDURE

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron Universal Tester—a testing machine of the constant rate-of-jaw separation type. The machine was equipped with suitable grips capable of clamping the specimens firmly and without slippage throughout the tests.
8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 93° C. Specimens were allowed 15 minutes to preheat prior to testing at elevated temperatures.
9. Adhesion strength is defined as: peel adhesion strength (lbs./inch)=pounds force×sample width; shear adhesion strength (lbs./square inch)=pounds force×sample width.

Seam peel adhesion and seam shear strength for Examples 1-6 were conducted according to the test procedure outlined hereinabove with actual measured values being reported in Tables V and VI, respectively.

TABLE V

Heat Seamable Roof Membranes - Seam Peel Adhesion Study

| Example No. | 1* | 2 | 3 | 4 | 5 | 6 |
|---|---|---|---|---|---|---|
| Peel Adhesion @ 23° C. Heat Setting #9 (442° C.) | | | | | | |
| lbs/inch | 16 | 16 | 20 | 21 | 28 | 29 |
| Type of failure | (A),(B) | (A) | (A),(B) | (A),(B) | (A),(B) | (A),(B) |
| Peel Adhesion @ 70° C.- 15 minute preheat at 70° C. | | | | | | |
| lbs/inch | 1 | 0.5 | 0.3 | >2.6 | >2.4 | >5.4 |
| Type of failure | (A),(B) | (A) | (A),(B) | (B) | (B) | (B) |
| Peel Adhesion @ 93° C.- 15 minute preheat at 93° C. | | | | | | |
| lbs/inch | 0.8 | 0.4 | 0.3 | 0.4 | >1.3 | >6.6 |

TABLE V-continued

Heat Seamable Roof Membranes - Seam Peel Adhesion Study

| Example No. | 1* | 2 | 3 | 4 | 5 | 6 |
|---|---|---|---|---|---|---|
| Type of failure | (A),(B) | (A) | (A) | (A),(B) | (B) | (B) |

*100% Amorphous EPDM control
(A) = Weld failure - failure at or near the rubber-to-rubber interface
(B) = Slight tearing at ply-to-ply interface, followed by rubber tearing to the fabric reinforcement (rubber-to-fabric failure)

TABLE VI

Heat Seamable Roof Membranes - Seam Shear Strength Study

| Example No. | 1* | 2 | 3 | 4 | 5 | 6 |
|---|---|---|---|---|---|---|
| Shear Strength @ 23° C. Heat setting #9 (442° C.) | | | | | | |
| lbs/square inch | >26 | >36 | >61 | >96 | >107 | >115 |
| Type of failure | (C) | (C) | (C) | (C) | (C) | (C) |
| Shear Strength @ 70° C.- 15 minute preheat at 70° C. | | | | | | |
| lbs/square inch | >20 | >27 | >38 | >47 | >62 | >63 |
| Type of failure | (C) | (C) | (C) | (C) | (C) | (C) |
| Shear Strength @ 93° C.- 15 minute preheat at 93° C. | | | | | | |
| lbs/square inch | >15 | >24 | >37 | >49 | >56 | >60 |
| Type of failure | (C) | (C) | (C) | (C) | (C) | (C) |

*100% Amorphous EPDM control
(C) = Necking/breaking - rubber test strip elongated and broke adjacent to the weld seam As can be determined from the adhesion data presented in Tables V and VI, seam peel adhesion and seam shear adhesion values were generally better for the heat seamable membranes (Examples No. 2-6) which featured blends of amorphous EPDM/HDPE 12065 as compared to the 100% amorphous EPDM control (Example No. 1). Seam peel adhesion for Example No. 1 (control) as shown in Table V was 16 lbs/inch at 23° C., while seam shear strengths at 23° C. in Table VI was >26 lbs/square inch. Examples No. 2-6 were based on blends of Vistalon® MD-744 and HDPE 12065, a highly crystalline homopolymer of polyethylene. Both room temperature and high temperature seam peel and shear adhesion results were improved by replacing from 10 to 50 parts by weight of amorphous EPDM, Vistalon® MD-744 with an equal amount of HDPE 12065.

The membrane of the present invention (Examples Nos. 2-6) exhibited rubber tearing to the fabric reinforcement and rubber-to-fabric failure during the seam peel strength test. In the seam shear strength test, the fabric reinforced membranes fail by stretching or necking and eventually break or tear adjacent to the weld seam.

The test samples listed in Tables V and VI were tested at a crosshead and chart speed of two inches per minute using a Model 1130 Instron® Universal Tester in accordance with the adhesion test set forth in ASTM D-413. Seam peel and shear strengths were measured at room temperature (23° C.) as well as 70° C. and 93° C.

In conclusion, it should be clear from the foregoing examples and specification disclosure that the use of highly crystalline thermoplasticity promoters together with EPDM terpolymers to prepare sheet material for roofing allows such sheet material to be seamed along the edge areas, using sufficient pressure and heat, so as to improve high temperature properties such as die C tear resistance, peel and seam shear strength. It is to be understood that the invention is not limited to the specific types of EPDM or thermoplasticity promoters exemplified herein or by the disclosure of other typical EPDM terpolymers provided herein, the examples having been provided merely to demonstrate the practice of the subject invention. Those skilled in the art may readily select other EPDM terpolymers, or other similar thermoplasticity promoters according to the disclosure made hereinabove. Similarly, the invention is not necessarily limited to the particular fillers and processing material exemplified or the amounts thereof.

In view of the properties described above, the compositions of the present invention are valuable in the production of roofing membranes. Roofing membranes formed from the compositions of the present invention may be produced by any method conventionally used for producing roofing membranes from filled polymer compositions. For example, the membranes may be formed by a conventional calendering technique. Other methods, including spray coating and roller die forming may also be used. Roofing membranes formed from the compositions of the present invention may optionally be scrim reinforced.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method for covering a roof with a heat seamable sheet material for roofing prepared from an uncured polymeric composition of matter comprising the steps of:

applying layers of self-adhering sheet material prepared from an uncured heat seamable polymeric composition of matter to the roof being covered;

overlapping adjacent edges of said layers;

heating the overlapped areas to slightly above the softening point of the sheet material and seaming the overlapped areas using heat and under sufficient pressure to provide an acceptable seam strength, said composition of matter having sufficient self-adhesion without the use of an adhesive and comprising 100 parts by weight of an uncured polymer blend comprising from about 50 to 90 parts by weight of a polymer selected from the group consisting of EPDM terpolymers having a number average molecular number of at least 30,000 and a weight average molecular weight of at least 100,000 and up to about 2 percent by weight crystallinity and mixtures thereof; and from about 10 to 50 parts by weight of a highly crystalline thermoplasticity promoter having at least 2 percent by weight crystallinity selected from the group consisting of polyolefin polymers prepared from monomers containing from two to eight carbon atoms;

from about 50 to 250 parts by weight of a filler selected from the group consisting of reinforcing and non-reinforcing materials and mixtures thereof per 100 parts of said polymer blend and from about 20 to 150 parts by weight of a processing material and mixtures thereof per 100 parts of said polymer blend.

2. A method, as set forth in claim 1, wherein the step of heating is conducted under a temperature of at least about 82° C.

3. A method, as set forth in claim 1, wherein said filler comprises about 110 parts by weight of carbon black and said composition of matter includes about 70 by weight of processing oil.

* * * * *